(12) United States Patent
Eryurek et al.

(10) Patent No.: US 7,702,401 B2
(45) Date of Patent: Apr. 20, 2010

(54) SYSTEM FOR PRESERVING AND DISPLAYING PROCESS CONTROL DATA ASSOCIATED WITH AN ABNORMAL SITUATION

(75) Inventors: Evren Eryurek, Melbourne, FL (US); Jon Westbrock, Rosemount, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 208 days.

(21) Appl. No.: 11/899,213

(22) Filed: Sep. 5, 2007

(65) Prior Publication Data

US 2009/0062933 A1    Mar. 5, 2009

(51) Int. Cl.
- G05B 11/01    (2006.01)
- G05B 9/02    (2006.01)
- G05B 13/02    (2006.01)
- G06F 19/00    (2006.01)
- G06F 11/30    (2006.01)
- G06C 17/00    (2006.01)

(52) U.S. Cl. ............... 700/21; 700/12; 700/19; 700/51; 700/79; 700/80; 702/181; 702/182; 702/183; 702/184

(58) Field of Classification Search .............. 700/12, 700/19, 21, 51, 79–80; 702/181–184
See application file for complete search history.

(56) References Cited

U.S. PATENT DOCUMENTS

| | | |
|---|---|---|
| 3,096,434 A | 7/1963 | King |
| 3,404,264 A | 10/1968 | Kugler |
| 3,701,280 A | 10/1972 | Stroman |
| 3,705,516 A | 12/1972 | Reis |

(Continued)

FOREIGN PATENT DOCUMENTS

| CN | 1007757 | 4/1990 |
|---|---|---|

(Continued)

OTHER PUBLICATIONS

"Components of GE PREDICTOR™ Services," GE Industrial Systems, available at http://www.geindustrial.com/cwc/services?id=74 on Jul. 18, 2002.

(Continued)

*Primary Examiner*—Ramesh B Patel
(74) *Attorney, Agent, or Firm*—Marshall, Gerstein & Borun LLP

(57) ABSTRACT

A system for preserving process variable data relating to the operation of a process is provided. The system is adapted to preserve process variable data obtained before, during, and after the occurrence of an abnormal situation or event. The preserved process variable data maybe communicated from smart field devices or other intelligent equipment relating to the control of the process to a process controller or other higher level control device. The process controller or other higher level control device may then cause the preserved data to be displayed for an operator or other maintenance personnel. The preserved data may also be provided to other process control modules or abnormal situation prevention systems for further analysis to develop methods for preventing the abnormal situation from recurring in the future, or for taking additional steps based on the abnormal situation data to minimize or prevent a further deterioration of the process operation.

26 Claims, 4 Drawing Sheets

U.S. PATENT DOCUMENTS

| | | |
|---|---|---|
| 3,981,836 A | 9/1976 | Pangle, Jr. et al. |
| RE29,383 E | 9/1977 | Gallatin et al. |
| 4,058,275 A | 11/1977 | Banks et al. |
| 4,099,413 A | 7/1978 | Ohte et al. |
| 4,322,976 A | 4/1982 | Sisson et al. |
| 4,337,516 A | 6/1982 | Murphy et al. |
| 4,408,285 A | 10/1983 | Sisson et al. |
| 4,425,798 A | 1/1984 | Nagai et al. |
| 4,435,770 A | 3/1984 | Shiohata et al. |
| 4,493,042 A | 1/1985 | Shima et al. |
| 4,517,468 A | 5/1985 | Kemper et al. |
| 4,527,271 A | 7/1985 | Hallee et al. |
| 4,530,234 A | 7/1985 | Cullick et al. |
| 4,607,325 A | 8/1986 | Horn |
| 4,635,214 A | 1/1987 | Kasai et al. |
| 4,642,782 A | 2/1987 | Kemper et al. |
| 4,644,478 A | 2/1987 | Stephens et al. |
| 4,644,749 A | 2/1987 | Somes |
| 4,649,515 A | 3/1987 | Thompson et al. |
| 4,657,179 A | 4/1987 | Aggers et al. |
| 4,683,542 A | 7/1987 | Taniguti |
| 4,707,796 A | 11/1987 | Calabro et al. |
| 4,734,873 A | 3/1988 | Malloy et al. |
| 4,758,964 A | 7/1988 | Bittner et al. |
| 4,763,243 A | 8/1988 | Barlow et al. |
| 4,764,862 A | 8/1988 | Barlow et al. |
| 4,770,543 A | 9/1988 | Burghoff et al. |
| 4,777,585 A | 10/1988 | Kokawa et al. |
| 4,819,233 A | 4/1989 | Delucia et al. |
| 4,831,564 A | 5/1989 | Suga et al. |
| 4,843,557 A | 6/1989 | Ina et al. |
| 4,853,175 A | 8/1989 | Book, Sr. |
| 4,858,144 A | 8/1989 | Marsaly et al. |
| 4,873,655 A | 10/1989 | Kondraske |
| 4,885,694 A | 12/1989 | Pray et al. |
| 4,885,707 A | 12/1989 | Nichol et al. |
| 4,907,167 A | 3/1990 | Skeirik |
| 4,910,691 A | 3/1990 | Skeirik |
| 4,922,412 A | 5/1990 | Lane et al. |
| 4,924,418 A | 5/1990 | Bachman et al. |
| 4,934,196 A | 6/1990 | Romano |
| 4,942,514 A | 7/1990 | Miyagaki et al. |
| 4,944,035 A | 7/1990 | Roger et al. |
| 4,956,793 A | 9/1990 | Bonne et al. |
| 4,964,125 A | 10/1990 | Kim |
| 4,965,742 A | 10/1990 | Skeirik |
| 4,980,844 A | 12/1990 | Demjanenko et al. |
| 4,992,965 A | 2/1991 | Holter et al. |
| 5,005,142 A | 4/1991 | Lipchak et al. |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,862 A | 8/1991 | Takahashi et al. |
| 5,043,863 A | 8/1991 | Bristol et al. |
| 5,050,095 A | 9/1991 | Samad |
| 5,053,815 A | 10/1991 | Wendell |
| 5,070,458 A | 12/1991 | Gilmore et al. |
| 5,081,598 A | 1/1992 | Bellows et al. |
| 5,089,978 A | 2/1992 | Lipner et al. |
| 5,089,984 A | 2/1992 | Struger et al. |
| 5,094,107 A | 3/1992 | Schoch |
| 5,098,197 A | 3/1992 | Shepard et al. |
| 5,099,436 A | 3/1992 | McCown et al. |
| 5,103,409 A | 4/1992 | Shimizu et al. |
| 5,111,531 A | 5/1992 | Grayson et al. |
| 5,121,467 A | 6/1992 | Skeirik |
| 5,122,976 A | 6/1992 | Bellows et al. |
| 5,130,936 A | 7/1992 | Sheppard et al. |
| 5,134,574 A | 7/1992 | Beaverstock et al. |
| 5,140,530 A | 8/1992 | Guha et al. |
| 5,142,612 A | 8/1992 | Skeirik |
| 5,148,378 A | 9/1992 | Shibayama et al. |
| 5,158,667 A | 10/1992 | Barlow et al. |
| 5,161,013 A | 11/1992 | Rylander et al. |
| 5,167,009 A | 11/1992 | Skeirik |
| 5,175,678 A | 12/1992 | Frerichs et al. |
| 5,187,674 A | 2/1993 | Bonne |
| 5,189,232 A | 2/1993 | Shabtai et al. |
| 5,193,143 A | 3/1993 | Kaemmerer et al. |
| 5,197,114 A | 3/1993 | Skeirik |
| 5,197,328 A | 3/1993 | Fitzgerald |
| 5,200,028 A | 4/1993 | Tatsumi et al. |
| 5,200,958 A | 4/1993 | Hamilton et al. |
| 5,210,704 A | 5/1993 | Husseiny |
| 5,212,765 A | 5/1993 | Skeirik |
| 5,214,582 A | 5/1993 | Gray |
| 5,224,203 A | 6/1993 | Skeirik |
| 5,228,780 A | 7/1993 | Shepard et al. |
| 5,235,527 A | 8/1993 | Ogawa et al. |
| 5,251,151 A | 10/1993 | Demjanenko et al. |
| 5,258,113 A | 11/1993 | Edgerton et al. |
| 5,265,031 A | 11/1993 | Malczewski |
| 5,265,222 A | 11/1993 | Nishiya et al. |
| 5,274,572 A | 12/1993 | O'Neill et al. |
| 5,282,131 A | 1/1994 | Rudd et al. |
| 5,282,261 A | 1/1994 | Skeirik |
| 5,291,190 A | 3/1994 | Scarola et al. |
| 5,293,585 A | 3/1994 | Morita |
| 5,301,101 A | 4/1994 | MacArthur et al. |
| 5,303,181 A | 4/1994 | Stockton |
| 5,305,230 A | 4/1994 | Matsumoto et al. |
| 5,311,421 A | 5/1994 | Nomura et al. |
| 5,311,447 A | 5/1994 | Bonne |
| 5,311,562 A | 5/1994 | Palosamy et al. |
| 5,315,521 A | 5/1994 | Hanson et al. |
| 5,317,520 A | 5/1994 | Castle |
| 5,325,522 A | 6/1994 | Vaughn |
| 5,327,357 A | 7/1994 | Feinstein et al. |
| 5,329,443 A | 7/1994 | Bonaquist et al. |
| 5,333,240 A | 7/1994 | Matsumoto et al. |
| 5,333,298 A | 7/1994 | Bland et al. |
| 5,347,449 A | 9/1994 | Meyer et al. |
| 5,349,541 A | 9/1994 | Alexandro, Jr. et al. |
| 5,351,184 A | 9/1994 | Lu et al. |
| 5,353,207 A | 10/1994 | Keeler et al. |
| 5,353,315 A | 10/1994 | Scarola et al. |
| 5,361,612 A | 11/1994 | Voiculescu et al. |
| 5,369,581 A * | 11/1994 | Ohsuga et al. ............... 701/48 |
| 5,369,599 A | 11/1994 | Sadjadi et al. |
| 5,373,452 A | 12/1994 | Guha |
| 5,384,698 A | 1/1995 | Jelinek |
| 5,384,699 A | 1/1995 | Levy et al. |
| 5,386,373 A | 1/1995 | Keeler et al. |
| 5,390,287 A | 2/1995 | Obata et al. |
| 5,390,326 A | 2/1995 | Shah |
| 5,394,341 A | 2/1995 | Kepner |
| 5,394,543 A | 2/1995 | Hill et al. |
| 5,396,415 A | 3/1995 | Konar et al. |
| 5,398,303 A | 3/1995 | Tanaka |
| 5,400,246 A | 3/1995 | Wilson et al. |
| 5,404,064 A | 4/1995 | Mermelstein et al. |
| 5,408,406 A | 4/1995 | Mathur et al. |
| 5,408,586 A | 4/1995 | Skeirik |
| 5,414,645 A | 5/1995 | Hirano et al. |
| 5,419,197 A | 5/1995 | Ogi et al. |
| 5,430,642 A | 7/1995 | Nakajima et al. |
| 5,431,460 A | 7/1995 | Hass et al. |
| 5,440,478 A | 8/1995 | Fisher et al. |
| 5,442,544 A | 8/1995 | Jelinek |
| 5,461,570 A | 10/1995 | Wang et al. |
| 5,467,355 A | 11/1995 | Umeda et al. |
| 5,469,735 A | 11/1995 | Watanabe et al. |
| 5,483,387 A | 1/1996 | Bauhahn et al. |

| | | | | | | |
|---|---|---|---|---|---|---|
| 5,485,753 A | 1/1996 | Burns et al. | | 5,796,606 A | 8/1998 | Spring |
| 5,486,920 A | 1/1996 | Killpatrick et al. | | 5,796,609 A | 8/1998 | Tao et al. |
| 5,486,996 A | 1/1996 | Samad et al. | | 5,798,939 A | 8/1998 | Ochoa et al. |
| 5,488,697 A | 1/1996 | Kaemmerer et al. | | 5,803,724 A | 9/1998 | Oortwijn et al. |
| 5,489,831 A | 2/1996 | Harris | | 5,805,442 A | 9/1998 | Crater et al. |
| 5,499,188 A | 3/1996 | Kline, Jr. et al. | | 5,809,490 A | 9/1998 | Guiver et al. |
| 5,500,941 A | 3/1996 | Gil et al. | | 5,812,394 A | 9/1998 | Lewis et al. |
| 5,504,863 A | 4/1996 | Yoshida et al. | | 5,819,050 A | 10/1998 | Boehling et al. |
| 5,511,004 A | 4/1996 | Dubost et al. | | 5,819,232 A | 10/1998 | Shipman |
| 5,511,442 A | 4/1996 | Tame | | 5,825,645 A | 10/1998 | Konar et al. |
| 5,519,647 A | 5/1996 | DeVille | | 5,826,249 A | 10/1998 | Skeirik |
| 5,521,814 A | 5/1996 | Teran et al. | | 5,838,561 A | 11/1998 | Owen et al. |
| 5,521,842 A | 5/1996 | Yamoda | | 5,842,189 A | 11/1998 | Keeler et al. |
| 5,528,510 A | 6/1996 | Kraft | | 5,847,952 A | 12/1998 | Samad |
| 5,533,413 A | 7/1996 | Kobayashi et al. | | 5,848,365 A | 12/1998 | Coverdill |
| 5,537,310 A | 7/1996 | Tanake et al. | | 5,855,791 A | 1/1999 | Hays et al. |
| 5,541,833 A | 7/1996 | Bristol et al. | | 5,859,773 A | 1/1999 | Keeler et al. |
| 5,546,301 A | 8/1996 | Agrawal et al. | | 5,859,885 A | 1/1999 | Rusnica et al. |
| 5,548,528 A | 8/1996 | Keeler et al. | | 5,859,964 A | 1/1999 | Wang et al. |
| 5,552,984 A | 9/1996 | Crandall et al. | | 5,875,420 A | 2/1999 | Piety et al. |
| 5,559,690 A | 9/1996 | Keeler et al. | | 5,877,954 A | 3/1999 | Klimasauskas et al. |
| 5,561,599 A | 10/1996 | Lu | | 5,880,716 A | 3/1999 | Kunugi |
| 5,566,065 A | 10/1996 | Hansen et al. | | 5,892,679 A | 4/1999 | He |
| 5,570,282 A | 10/1996 | Hansen et al. | | 5,892,939 A | 4/1999 | Call et al. |
| 5,570,300 A | 10/1996 | Henry et al. | | 5,898,869 A | 4/1999 | Anderson |
| 5,572,420 A | 11/1996 | Lu | | 5,901,058 A | 5/1999 | Steinman et al. |
| 5,574,638 A | 11/1996 | Lu | | 5,903,455 A | 5/1999 | Sharpe, Jr. et al. |
| 5,586,066 A | 12/1996 | White et al. | | 5,905,989 A | 5/1999 | Biggs |
| 5,596,704 A | 1/1997 | Geddes et al. | | 5,907,701 A | 5/1999 | Hanson |
| 5,598,521 A | 1/1997 | Kilgore et al. | | 5,909,370 A | 6/1999 | Lynch |
| 5,600,148 A | 2/1997 | Cole et al. | | 5,909,541 A | 6/1999 | Sampson et al. |
| 5,602,757 A | 2/1997 | Haseley et al. | | 5,909,586 A | 6/1999 | Anderson |
| 5,602,761 A | 2/1997 | Spoerre et al. | | 5,914,875 A | 6/1999 | Monta et al. |
| 5,604,914 A | 2/1997 | Kabe | | 5,918,233 A | 6/1999 | La Chance et al. |
| 5,606,513 A | 2/1997 | Louwagie et al. | | 5,922,963 A | 7/1999 | Piety et al. |
| 5,610,339 A | 3/1997 | Haseley et al. | | 5,924,086 A | 7/1999 | Mathur et al. |
| 5,623,598 A | 4/1997 | Voigt et al. | | 5,940,290 A | 8/1999 | Dixon |
| 5,625,574 A | 4/1997 | Griffiths et al. | | 5,948,101 A | 9/1999 | David et al. |
| 5,628,994 A | 5/1997 | Kaper et al. | | 5,949,417 A | 9/1999 | Calder |
| 5,631,825 A | 5/1997 | van Weele et al. | | 5,951,654 A | 9/1999 | Avsan et al. |
| 5,640,491 A | 6/1997 | Bhat et al. | | 5,960,214 A | 9/1999 | Sharpe, Jr. et al. |
| 5,640,493 A | 6/1997 | Skeirik | | 5,960,441 A | 9/1999 | Bland et al. |
| 5,646,350 A | 7/1997 | Robinson et al. | | 5,975,737 A | 11/1999 | Crater et al. |
| 5,654,841 A | 8/1997 | Hobson et al. | | 5,984,502 A | 11/1999 | Calder |
| 5,665,906 A | 9/1997 | Bayer | | 5,988,847 A | 11/1999 | McLaughlin et al. |
| 5,666,297 A | 9/1997 | Britt et al. | | 5,995,916 A | 11/1999 | Nixon et al. |
| 5,671,335 A | 9/1997 | Davis et al. | | 5,997,167 A | 12/1999 | Crater et al. |
| 5,671,351 A | 9/1997 | Wild et al. | | 6,006,171 A | 12/1999 | Vines et al. |
| 5,675,504 A | 10/1997 | Serodes et al. | | 6,008,985 A | 12/1999 | Lake et al. |
| 5,680,409 A | 10/1997 | Qin et al. | | 6,014,598 A | 1/2000 | Duyar et al. |
| 5,682,309 A | 10/1997 | Bartusiak et al. | | 6,014,612 A | 1/2000 | Larson et al. |
| 5,687,090 A | 11/1997 | Chen et al. | | 6,014,876 A | 1/2000 | Taylor |
| 5,691,895 A | 11/1997 | Kurtzberg et al. | | 6,017,143 A | 1/2000 | Eryurek et al. |
| 5,692,158 A | 11/1997 | Degeneff et al. | | 6,026,352 A | 2/2000 | Burns et al. |
| 5,698,788 A | 12/1997 | Mol et al. | | 6,033,257 A | 3/2000 | Lake et al. |
| 5,704,011 A | 12/1997 | Hansen et al. | | 6,035,339 A | 3/2000 | Agraharam et al. |
| 5,715,158 A | 2/1998 | Chen | | 6,038,486 A | 3/2000 | Saitoh et al. |
| 5,719,767 A | 2/1998 | Jang et al. | | 6,041,263 A | 3/2000 | Boston et al. |
| 5,729,661 A | 3/1998 | Keeler et al. | | 6,047,220 A | 4/2000 | Eryurek |
| 5,740,324 A | 4/1998 | Mathur et al. | | 6,047,221 A | 4/2000 | Piche et al. |
| 5,742,513 A | 4/1998 | Bouhenguel et al. | | 6,055,483 A | 4/2000 | Lu |
| 5,753,802 A | 5/1998 | Falkler | | 6,061,603 A | 5/2000 | Papadopoulos et al. |
| 5,754,451 A | 5/1998 | Williams | | 6,061,640 A * | 5/2000 | Tanaka et al. ................. 702/81 |
| 5,757,371 A | 5/1998 | Oran et al. | | 6,067,505 A | 5/2000 | Bonoyer et al. |
| 5,757,748 A | 5/1998 | Kiyoura et al. | | 6,076,124 A | 6/2000 | Korowitz et al. |
| 5,761,518 A | 6/1998 | Boehling et al. | | 6,078,843 A | 6/2000 | Shavit |
| 5,764,891 A | 6/1998 | Warrior | | 6,093,211 A | 7/2000 | Hamielec et al. |
| 5,768,119 A | 6/1998 | Havekost et al. | | 6,106,785 A | 8/2000 | Havlena et al. |
| 5,777,872 A | 7/1998 | He | | 6,108,616 A | 8/2000 | Borchers et al. |
| 5,781,432 A | 7/1998 | Keeler et al. | | 6,110,214 A | 8/2000 | Klimasauskas |
| 5,781,878 A | 7/1998 | Mizoguchi et al. | | 6,119,047 A | 9/2000 | Eryurek et al. |
| 5,790,898 A | 8/1998 | Kishima et al. | | 6,122,555 A | 9/2000 | Lu |
| 5,796,602 A | 8/1998 | Wellan et al. | | 6,128,279 A | 10/2000 | O'Neil et al. |

| Patent Number | Date | Inventor |
|---|---|---|
| 6,134,032 A | 10/2000 | Kram et al. |
| 6,134,574 A | 10/2000 | Oberman et al. |
| 6,144,952 A | 11/2000 | Keeler et al. |
| 6,169,980 B1 | 1/2001 | Keeler et al. |
| 6,185,470 B1 | 2/2001 | Pado et al. |
| 6,197,480 B1 | 3/2001 | Iguchi et al. |
| 6,246,950 B1 | 6/2001 | Bessler et al. |
| 6,246,972 B1 | 6/2001 | Klimasauskas |
| 6,259,959 B1 | 7/2001 | Martin |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,638 B1 | 11/2001 | Schreder et al. |
| 6,317,701 B1 | 11/2001 | Pyotsia et al. |
| 6,332,110 B1 | 12/2001 | Wolfe |
| 6,387,114 B2 | 5/2002 | Adams |
| 6,389,331 B1 | 5/2002 | Jensen et al. |
| 6,391,114 B1 | 5/2002 | Kirimura |
| 6,397,114 B1 | 5/2002 | Eryurek |
| 6,400,681 B1 | 6/2002 | Bertin et al. |
| 6,418,465 B1 | 7/2002 | Hirosawa et al. |
| 6,421,571 B1 | 7/2002 | Spriggs et al. |
| 6,445,963 B1 | 9/2002 | Blevins et al. |
| 6,507,797 B1 | 1/2003 | Kliman et al. |
| 6,529,780 B1 | 3/2003 | Soergel et al. |
| 6,532,392 B1 | 3/2003 | Eryurek et al. |
| 6,535,769 B1 | 3/2003 | Konar et al. |
| 6,539,267 B1 | 3/2003 | Eryurek et al. |
| 6,549,130 B1 | 4/2003 | Joao |
| 6,567,718 B1 | 5/2003 | Campbell et al. |
| 6,571,273 B1 | 5/2003 | Shirai et al. |
| 6,591,260 B1 | 7/2003 | Schwarzhoff et al. |
| 6,594,589 B1 | 7/2003 | Coss, Jr. et al. |
| 6,601,005 B1 | 7/2003 | Eryurek et al. |
| 6,601,995 B1 | 8/2003 | Harrison et al. |
| 6,609,036 B1 | 8/2003 | Bickford |
| 6,609,040 B1 | 8/2003 | Brunnemann |
| 6,615,090 B1 | 9/2003 | Blevins et al. |
| 6,628,994 B1 | 9/2003 | Turicchi, Jr. et al. |
| 6,633,782 B1 | 10/2003 | Schleiss et al. |
| 6,651,012 B1 | 11/2003 | Bechhoefer |
| 6,654,697 B1 | 11/2003 | Eryurek et al. |
| 6,690,274 B1 | 2/2004 | Bristol |
| 6,704,689 B1 | 3/2004 | Hogan et al. |
| 6,717,513 B1 | 4/2004 | Sandelman et al. |
| 6,721,609 B1 | 4/2004 | Wojsznis |
| 6,732,191 B1 | 5/2004 | Baker et al. |
| 6,738,388 B1 | 5/2004 | Stevenson et al. |
| 6,758,168 B2 | 7/2004 | Koskinen et al. |
| 6,760,782 B1 | 7/2004 | Swales |
| 6,769,171 B2 | 8/2004 | Jung et al. |
| 6,774,786 B1 | 8/2004 | Havekost |
| 6,813,532 B2 | 11/2004 | Eryurek et al. |
| 6,836,705 B2 | 12/2004 | Hellmann et al. |
| 6,907,383 B2 | 6/2005 | Eryurek et al. |
| 6,965,806 B2 | 11/2005 | Eryurek et al. |
| 7,076,380 B2 | 7/2006 | Michel |
| 7,079,984 B2 * | 7/2006 | Eryurek et al. ............... 702/185 |
| 7,085,610 B2 | 8/2006 | Eryurek et al. |
| 7,233,834 B2 | 6/2007 | McDonald, Jr. et al. |
| 7,395,139 B2 * | 7/2008 | Burton et al. ................. 701/19 |
| 7,533,070 B2 * | 5/2009 | Guralnik et al. .............. 706/16 |
| 2002/0022894 A1 | 2/2002 | Eryurek et al. |
| 2002/0029130 A1 | 3/2002 | Eryurek et al. |
| 2002/0038156 A1 | 3/2002 | Eryurek et al. |
| 2002/0067370 A1 | 6/2002 | Forney et al. |
| 2002/0077711 A1 | 6/2002 | Nixon et al. |
| 2002/0107858 A1 | 8/2002 | Lundahl et al. |
| 2002/0133320 A1 | 9/2002 | Wegerich et al. |
| 2002/0147511 A1 | 10/2002 | Eryurek et al. |
| 2002/0161940 A1 | 10/2002 | Eryurek et al. |
| 2002/0163427 A1 | 11/2002 | Eryurek et al. |
| 2003/0002969 A1 | 1/2003 | Risser |
| 2003/0009572 A1 | 1/2003 | Thurner |
| 2003/0014226 A1 | 1/2003 | Loecher et al. |
| 2003/0014500 A1 | 1/2003 | Schleiss et al. |
| 2003/0028268 A1 | 2/2003 | Eryurek et al. |
| 2003/0028269 A1 | 2/2003 | Spriggs et al. |
| 2003/0065409 A1 | 4/2003 | Raeth et al. |
| 2003/0074159 A1 | 4/2003 | Bechhoefer et al. |
| 2003/0121330 A1 | 7/2003 | Muhle et al. |
| 2003/0172002 A1 | 9/2003 | Spira et al. |
| 2003/0195934 A1 | 10/2003 | Peterson et al. |
| 2003/0236579 A1 | 12/2003 | Hauhia et al. |
| 2004/0052526 A1 | 3/2004 | Jones et al. |
| 2004/0064465 A1 | 4/2004 | Yadav et al. |
| 2004/0067645 A1 * | 4/2004 | Chen et al. ................... 438/689 |
| 2004/0068392 A1 | 4/2004 | Mylaraswamy |
| 2004/0075689 A1 | 4/2004 | Schleiss et al. |
| 2004/0078171 A1 | 4/2004 | Wegerich et al. |
| 2004/0095237 A1 | 5/2004 | Chen et al. |
| 2004/0158772 A1 | 8/2004 | Pan et al. |
| 2004/0167686 A1 * | 8/2004 | Baker et al. ................... 701/19 |
| 2004/0181364 A1 | 9/2004 | Reeves et al. |
| 2004/0249583 A1 | 12/2004 | Eryurek et al. |
| 2005/0007249 A1 | 1/2005 | Eryurek et al. |
| 2005/0015624 A1 | 1/2005 | Ginter et al. |
| 2005/0060103 A1 | 3/2005 | Chamness |
| 2005/0143873 A1 | 6/2005 | Wilson |
| 2005/0197792 A1 | 9/2005 | Haeuptle |
| 2005/0197803 A1 * | 9/2005 | Eryurek et al. ............... 702/185 |
| 2005/0197805 A1 | 9/2005 | Eryurek et al. |
| 2005/0197806 A1 | 9/2005 | Eryurek et al. |
| 2005/0240289 A1 | 10/2005 | Hoyte et al. |
| 2005/0251579 A1 | 11/2005 | Ngo et al. |
| 2005/0256601 A1 | 11/2005 | Lee et al. |
| 2005/0267709 A1 | 12/2005 | Heavner et al. |
| 2006/0020423 A1 | 1/2006 | Sharpe, Jr. |
| 2006/0047489 A1 | 3/2006 | Scheidt et al. |
| 2006/0052991 A1 | 3/2006 | Pflugl et al. |
| 2006/0067388 A1 | 3/2006 | Sedarat |
| 2006/0074598 A1 | 4/2006 | Emigholz et al. |
| 2006/0157029 A1 | 7/2006 | Suzuki et al. |
| 2006/0206288 A1 | 9/2006 | Brahmajosyula et al. |
| 2006/0265625 A1 | 11/2006 | Dubois et al. |
| 2007/0005298 A1 | 1/2007 | Allen et al. |
| 2007/0010900 A1 | 1/2007 | Kavaklioglu et al. |
| 2007/0017291 A1 * | 1/2007 | Cypes et al. ................... 73/590 |
| 2007/0097873 A1 | 5/2007 | Ma et al. |
| 2007/0109301 A1 | 5/2007 | Smith |
| 2008/0027678 A1 | 1/2008 | Miller |
| 2009/0112335 A1 * | 4/2009 | Mehta et al. ................... 700/29 |

FOREIGN PATENT DOCUMENTS

| | | |
|---|---|---|
| CN | 1097804 | 1/1995 |
| CN | 1267373 | 9/2000 |
| DE | 35 40 204 | 9/1986 |
| DE | 40 08 560 | 9/1990 |
| DE | 44 33 593 | 6/1995 |
| DE | 195 02 499 | 8/1996 |
| DE | 101 14 206 A1 | 11/2001 |
| DE | 102 32 164 | 2/2004 |
| EP | 0 122 622 | 10/1984 |
| EP | 0 362 386 | 4/1990 |
| EP | 0 377 736 | 7/1990 |
| EP | 0 413 814 | 2/1991 |
| EP | 0 487 419 A2 | 5/1992 |
| EP | 0 581 451 | 2/1994 |
| EP | 0 594 227 | 4/1994 |
| EP | 0 612 039 | 8/1994 |
| EP | 0 624 847 | 11/1994 |
| EP | 0 626 697 | 11/1994 |
| EP | 0 644 470 | 3/1995 |
| EP | 0 715 160 | 6/1996 |
| EP | 0 827 096 | 3/1998 |

| | | |
|---|---|---|
| EP | 0 959 398 | 11/1999 |
| EP | 0 961 184 | 12/1999 |
| EP | 0 964 325 | 12/1999 |
| EP | 0 965 897 | 12/1999 |
| EP | 1 630 348 | 3/2006 |
| EP | 1 669 827 | 6/2006 |
| GB | 2 083 258 | 3/1982 |
| GB | 2 294 129 | 4/1996 |
| GB | 2 294 793 | 5/1996 |
| GB | 2 347 234 | 8/2000 |
| GB | 2 360 357 A | 9/2001 |
| GB | 2 379 749 | 3/2003 |
| GB | 2 380 833 | 4/2003 |
| GB | 2 394 312 A | 4/2004 |
| JP | 05-7138472 | 8/1982 |
| JP | 05-033537 | 2/1993 |
| JP | 06-242192 | 9/1994 |
| JP | 06-331507 | 12/1994 |
| JP | 07-127320 | 5/1995 |
| JP | 07-152714 | 6/1995 |
| JP | 07-234988 | 9/1995 |
| JP | 08-261886 | 10/1996 |
| JP | 10-039728 | 2/1998 |
| JP | 10-320039 | 12/1998 |
| JP | 11-231924 | 8/1999 |
| JP | 2000-305620 | 11/2000 |
| JP | 2001-016662 | 1/2001 |
| WO | WO 98/38585 | 9/1998 |
| WO | WO 99/13418 | 3/1999 |
| WO | WO 00/17721 | 3/2000 |
| WO | WO 00/50851 | 8/2000 |
| WO | WO 00/55700 | 9/2000 |
| WO | WO 00/62256 | 10/2000 |
| WO | WO 01/79947 A1 | 10/2001 |
| WO | WO 02/06919 | 1/2002 |
| WO | WO 02/23405 | 3/2002 |
| WO | WO 02/071168 | 9/2002 |
| WO | WO 02/071169 | 9/2002 |
| WO | WO 02/071170 | 9/2002 |
| WO | WO 02/071171 | 9/2002 |
| WO | WO 02/071172 | 9/2002 |
| WO | WO 02/071173 | 9/2002 |
| WO | WO 02/095509 | 11/2002 |
| WO | WO 02/095510 | 11/2002 |
| WO | WO 02/095633 | 11/2002 |
| WO | WO 03/019304 | 3/2003 |
| WO | WO 03/075206 | 9/2003 |
| WO | WO 2005/019948 | 3/2005 |
| WO | WO 2005/093531 | 10/2005 |
| WO | WO 2005/093534 | 10/2005 |
| WO | WO 2005/093535 | 10/2005 |
| WO | WO 2006/026340 | 3/2006 |
| WO | WO 2006/107933 | 10/2006 |
| WO | WO 2007/087729 | 8/2007 |
| WO | WO 2008/014349 | 1/2008 |
| WO | WO-2008/039992 | 4/2008 |
| WO | WO-2008/085706 | 7/2008 |

OTHER PUBLICATIONS

"Customer Benefits," GE Industrial Systems, available at http://www.geindustrial.com/cwc/services?id=75 on Jul. 18, 2002.

"Customer Impact," GE Industrial Systems, available at http://www.geindustrial.com/cwc/services?id=73 on Jul. 18, 2002.

"Electrical Equipment Coverage," GE Industrial Systems, available at http://www.geindustrial.com/cwc/services?id=72 on Jul. 18, 2002.

"GE PREDICTOR™ Services: GE Predictor Services Overview," GE Industrial Systems, available at http://www.geindustrial.com/cwc/services?id=71 on Jul. 18, 2002.

"Status Signals of Field Instruments," NAMUR Recommendation, NA 64, Feb. 1, 2001, pp. 1-8.

"The HART Protocol—A Solution Enabling Technology," http://www.hartcomm.org 5 pages, (Feb. 2004).

"Time to Tap Into HART," http://www.hartcomm.org 3 pages, (Nov. 2003).

Adler, http://www.hartcomm.org, "Continuous HART Communication Increases Safety Integrity Level (SIL)," 3 pages, (Dec. 2000).

Anonymous, "Labview—Digital Filter Design Toolkit User Manual," National Instruments, Retrieved from the Internation on Dec. 8, 2008. URL: http://digital.ni.com/manuals.nsf/websearch/A685C04E4EF714E986256F800072D9C5.

Anonymous, "Signal Processing Blockset User's Guide—Version 6.0.1," Mathworks, Inc., Internet Publication (2004). URL: http://www.mathworks.com.

Chiang et al. "Fault Detection and Diagnosis in Industrial Systems," 35-84 Springer-Verlag London Limited, (2001).

Chiang, et al., "Fault Diagnosis in Chemical Processes Using Fisher Discriminant Analysis, Discriminant Partial Least Squares, and Principal Component Analysis," *Chemometrics and Intelligent Laboratory Systems*, 50: 243-252 (2000).

Defernez et al., "The Use and Misuse of Chemometrics for Treating Classification Problems," *Trends in Analytical Chemistry*, 16(4): 216-221 (1997).

dotnet.za.net, "Web Services—A Guide for Business and IT Managers (Sep. 23, 2001)", (Copyright 2001), www.dotnet.za.net.

Du et al., "Automated Monitoring of Manufacturing Processes, Part 1: Monitoring Methods," *J. Engineering for Industry*, 117:121-132 (1995).

Ellis et al., "Tutorial: Delayed Coking Fundamentals," AIChE 200 Spring National Meeting—*International Conference on Refining Processes Topical Conference Preprints* (1998).

Erguo et al., "An Input-Training Neural Network-Based Nonlinear Principal Component Analysis Approach for Fault Diagnosis," *Proceedings of the 4th World Congress on Intelligent Control and Automation*, pp. 2755-2759 (2002).

Eryurek et al., "Abnormal Situation Prevention Through Smart Field Devices," NPRA 2005 Annual Meeting, Mar. 13-15, San Francisco, CA (2005).

Frank, "Fault Diagnosis in Dynamic Systems Using Analytical and Knowledge-Based Redundancy—A Survey and Some New Results," Automatica, 26:459-474 (1990).

Franklin et al., "Parallel Analysis: A Method for Determining Significant Principal Components." *Journal of Vegetation Science*, 6:99-106 (1995).

Geladi, et al., "Partial Least-Squares Regression: A Tutorial," *Analytica Chimica Acta*, 185: 1-17 (1986).

Hamad et al., "Advances in Abnormal Situation Prevention in Refineries and Petrochemical Plants," AIChE 2006, Spring National Meeting.

Helson, "The Impact of HART on Process Automation, The Compelling Case for the World's Most Used Digital Communication Protocol," www.hartcomm.org (Jun. 2004).

Helson, http://www.hartcomm.org "HART Communication: Driving New Product Developments," 11 pages, (Mar. 2004).

Helson, http://www.hartcomm.org "The Impact of HART on Process Automation," 3 pages, (Jun. 2004).

Helson, http://www.hartcomm.org "Understanding the Power of HART Communication," 3 pages, (Mar. 2003).

Hines et al., "Sensor Validation and Instrument Calibration Monitoring," University of Tennesse Maintenance and Reliability Center (2001).

Horch, "Oscillation Diagnosis in Control Loops—Stiction and Other Causes," Proceedings of the 2006 American Control Conference, Minneapolis, Minnesota, pp. 2086-2096 (2006).

Hoskuldsson, "PLS Regression Methods," *Journal of Chemometrics*, 2: 211-228 (1998).

Internet web page printout of internet access: http://www.hartcomm.org/technical/applications/sasol.html "Sasol Wins 2005 HART Plant of the Year Award," (Nov. 1, 2005).

Isermann, "Fault Diagnosis of Machines via Parameter Estimation and Knowledge Processing—Tutorial paper," Automatica, 29: 815-835 (1993).

Kaistha et al., "Incipient Fault Detection and Isolation of Field Devices in Nuclear Power Systems Using Principal Component Analysis," *Nuclear Technology*, 136: 221-230 (2001).

Kalkhoff, "Agent-Oriented Robot Task Transformation," Proceedings of the International Symposium on Intelligent Control, IEEE, pp. 242-247 (Aug. 27, 1995).

Ku et al., "Disturbance Detection and Isolation by Dynamic Principal Component Analysis," Chemometrics and Intelligent Laboratory Systems, 30: 179-196 (1995).

Lighthammer Software Development, "Illuminator™ The 1st 'Plant Information Portal'™" (Copyright 1999).

Lin et al., "A Gray System Modeling Approach of the Prediction of Calibration Intervals," *IEEE Transactions on Instrumentation and Measurement*, 54(1): 297-304 (2005).

Matrikon product brochure, "OPC Archiving at MatrikonOPC.com," www.matrikonopc.com/products/opc-drivers/details.asp?driver=1039.

http://www.matrikonopc.com/products/opc-drivers/details.asp?driver=1039, 3 pages (Feb. 2006).

Matrikon product brochure, "OPC Client for ODBC at MatrikonOPC.com," www.matrikonopc.com/products/opc-drivers/detalls.asp?driver=1039, http://www.matrikonopc.com/products/opc-drivers/details.asp?driver=1039, 3 pages (Feb. 2006).

Matrikon product brochure, "OPC Desktop Historian at MatrikonOPC.com," www.matrikonopc.com/products/opc-archiving/opc-desktop-historian.asp http://www.matrikonopc.com/products/opc-archiving/opc-desktop-historian.asp, 4 pages (Feb. 2006).

Mehta et al., "Feedforward Neural Networks for Process Identification and Prediction," presented at ISA 2001, Houston, Texas, Sep. 2001.

Montgomery, "Control Charts as a Tool in SQC (Statistical Quality Control)" Control Charts as a Tool in SQC, available at http://deming.eng.clemson.edu/pub/tutorials/qctools/ccmain1.htm on May 30, 2006.

Naes et al., "Understanding the Collinearity Problem in Regression and Discriminant Analysis," *J. Chemometrics*, 15:413-426 (2001).

Namur Worksheet, "Status Signals of Field Instruments," NA 64, Feb. 1, 2001, pp. 1-8.

OSIsoft product brochure, "Discover the Power of the PI System," www.osisoft.com/5_267.aspx <http://www.osisoft.com/5_267.aspx, 2 pages (Feb. 2006).

OSIsoft product brochure, "The PI System: A Graphic Overview," 2 pages (2002).

OSIsoft product brochure, "The Power of PI System," 24 pages (2002).

Pettersson, "Execution Monitoring in Robotics: A Survey," *Robotics and Autonomous Systems*, 53:73-88 (2005).

Pratt, http://www.hartcomm.org , "HART Networks," 32 pages, (Apr. 2002).

Pratt, http://www.hartcomm.org , "Sorting Out the Protocols: Network Soup," 17 pages, (Jan. 2002).

Qin et al., "Nonlinear PLS Modeling Using Neural Networks," *Computers Chem. Engng.*, 16(4): 379-391 (1992).

Romeu, "Understanding Binomial Sequential Testing," START: Selected Topics in Assurance Related Technologies, 12(2):1-8 (2005).

Ruel, "Diagnose Loop Behavior to Find and Correct Problems with Final Control Elements, the Environment, and Upstream Systems Before You Tune the Controller," Loop Optimization, available at http://www.expertune.com/artConApr99.html on Jun. 1, 2006.

Russell et al., "Data-Driven Techniques for Fault Detection and Diagnosis in Chemical Processes," 33-80 Springer-Verlag London Limited (2000).

Schwarz et al., "Spectral Envelope Estimation and Representation for Sound Analysis-Synthesis," Spectral Envelope Estimation and Representation, available at http://recherche.ircam.fr/equipes/analyse-synthese/schwarz/publications/icmc1999/se99-poster.html on May 31, 2006.

Systinet, "Introduction to Web Services", (Copyright 2001, 2002), www.systinet.com.

Szanyi et al., "Diagnostics Capabilities of FOUNDATION Fieldbus Pressure Transmitters," *Hydrocarbon Processing*, pp. 53-59 (Apr. 2003).

Timbalia et al., "Fluid Catalytic Cracking Unit Advanced Control in a Distributed Control System," *ISA Transactions*, 30(2):53-61 (1991).

Tzovla et al., "Abnormal Condition Management Using Expert Systems," presented at ISA 2001, Houston, Texas, Sep. 2001.

Wise et al., "The Process Chemometrics Approach to Process Monitoring and Fault Detection," *J. Proc. Cont.*, 6,(6):329-348 (1996).

Yoon et al., "Fault Diagnosis with Multivariate Statistical Models Part I: Using Steady State Fault Signatures," *Journal of Process Control*, 11: 387-400 (2001).

Yoon et al., "Multivariate Process Monitoring and Early Fault Detection (MSPC) Using PCA and PLS," Plant Automation and Decision Support Conference, San Antonio, Texas, pp. 21-24 (Sep. 2003).

Zhao et al., "A Nonlinear Modeling and Online Monitoring Method for the Batch Process Using Multiple Local PCA," *Proceedings of the Second International Conference on Machine Learning and Cybernetics*, pp. 1190-1194 (2003).

Zolera Systems, "A Brief Guide to Web Services Protocols" (Copyright 2001), www.zolera.com.

International Search Report and Written Opinion for Application No. PCT/US2008/072999, dated Dec. 12, 2008.

International Search Report and Written Opinion for Application No. PCT/US2008/074180, dated Oct. 17, 2008.

International Search Report and Written Opinion for Application No. PCT/US2008/078589, dated Feb. 23, 2009.

International Search Report and Written Opinion for Application No. PCT/US2008/078594, dated Jan. 27, 2009.

International Search Report and Written Opinion for Application No. PCT/US2008/078595, dated Nov. 28, 2008.

International Search Report and Written Opinion for Application No. PCT/US2008/078592, dated Dec. 4, 2008.

* cited by examiner

SYSTEM FOR PRESERVING AND DISPLAYING PROCESS CONTROL DATA ASSOCIATED WITH AN ABNORMAL SITUATION

TECHNICAL FIELD

This patent relates generally to performing diagnostics and maintenance in a process plant, and more particularly to preserving and displaying statistical data relating to process variable data recorded by smart process control field devices and other process related field equipment.

DESCRIPTION OF THE RELATED ART

Process control systems, like those used in chemical, petroleum or other processes, typically include one or more centralized or decentralized process controllers. Process controllers may be communicatively coupled to at least one host or operator workstation and to one or more process control and instrumentation device. Process control and instrumentation devices may comprise, for example, field devices. The one or more centralized or decentralized controllers may be communicatively coupled to the at least one host or workstation and the one or more process control and instrumentation devices via one or more analog, digital or combined analog/digital buses. Field devices, which may be, for example, valves, valve positioners, switches, transmitters, and sensors (e.g., temperature, pressure, and flow rate sensors), are typically located within the process plant environment. The field devices perform functions within the process such as opening or closing valves, measuring process parameters, increasing or decreasing fluid flow, etc. Smart field devices such as field devices conforming to the well-known FOUNDATION™ fieldbus (hereinafter "fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or control blocks in field devices such as HART® and fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements such as software routines being in improper modes, improperly tuned process control loops, one or more failures in communications between devices within the process plant, etc. These and other problems, while numerous in nature, generally result in the process operating in an abnormal state (i.e., the process plant being in an abnormal condition) which is usually associated with suboptimal performance of the process plant.

Many diagnostic tools and applications have been developed to detect and determine the cause of problems within a process plant and to assist an operator or a maintenance person to diagnose and correct problems once the problems have occurred and have been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management, which includes numerous control module and control loop diagnostic tools. Likewise, maintenance workstations, which may be connected to the process control devices, such as field devices, via the same communication connections as the controller applications, or via different communication connections, such as object linking and embedding (OLE) for process control (OPC) connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the Asset Management Solutions (AMS™) Suite: Intelligent Device Manager application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS™ application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, a maintenance person may use this information to monitor, maintain, and/or diagnose problems with field devices.

Similarly, many process plants include equipment monitoring and diagnostic applications such as, for example, AMS™ Suite: Machinery Health Manager provided by Emerson Process Management, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, AMS™ Suite: Real-Time Optimizer, within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

As mentioned above, data from field devices and process controllers may be made available to hardware devices such as operator workstations, maintenance work stations, personal-computers, hand-held devices, data historians, report generators, centralized databases, and the like. This information may be provided to operators or maintenance personnel to allow them to perform various functions related to the process. The amount of data that may be displayed on such devices, however, may be limited by the communication channel over which the data are communicated. For example, smart field devices can often acquire process control data at a much higher data sampling rate than can be communicated to a process controller or other process control device over a typical process control system communication bus.

When abnormal situations occur in a process plant it is often desirable to have as much data on hand as possible in order to analyze the conditions that led to the abnormal situation. Because most field devices can gather process control data at a much higher sampling rate than can be communicated to a process controller, most of the data acquired by the field devices are never forwarded to the controller. As a result, vast amounts of process control data collected by the field devices are not available to operators or other maintenance personnel for analysis after abnormal situations occur. In many cases, data obtained by field devices in the normal course of operation may provide important clues as to the causes or circumstances that lead to abnormal situations. Therefore, when abnormal situations occur, it is desirable to preserve as much of this data as possible in a manner that will allow the data to be communicated to a process controller or other hardware device to be presented to operators or maintenance personnel to help them understand what was happening in the process at the time the abnormal situation occurred. In most cases, it is helpful to know what was happening to the process before, during, and after an abnormal event. Thus, it is desirable to capture data over an extended period that begins well before, and ends well after the abnormal situation is detected. In addition to preserving the process variable data obtained by the field devices, it is also necessary to develop techniques for communicating the preserved data to other devices within the limiting constraints of the communication bus and the communication protocol employed by the process control system installed in the particular process plant in which the process is being controlled.

SUMMARY OF THE DISCLOSURE

The present invention relates to a system and method for preserving process variable data relating to the operation of a process in a process plant. The systems and methods of the present invention are adapted to preserve process variable data obtained before, during and after the occurrence of an abnormal situation or event. The preserved process variable data may be communicated from a smart field device or other intelligent field equipment to a process controller or other higher level control device. The process controller or other higher level control device may then cause the preserved data to be displayed for an operator or other maintenance personnel. The preserved data may also be provided to other process control modules or abnormal situation prevention systems for further analysis to develop methods for preventing the abnormal situation from recurring in the future, or for taking additional steps based on the abnormal situation data to minimize or prevent a further deterioration of the process operation.

Accordingly, an embodiment of the invention provides a system for processing data related to an abnormal process event in a controlled process. The system includes a controller, a communication channel, and an intelligent device. The intelligent device may be a field device for controlling the process, or any other equipment related to carrying out the process. The intelligent device includes a processor, a memory, and an input device. The input device is adapted to receive process variable data. The processor is configured to temporarily store statistical data related to the received process variable data in the memory. The statistical data related to the received process variable data are stored in the memory at a first sample rate. The processor is further configured to communicate the statistical data stored in the memory to the controller over the communication channel. The statistical data are communicated at a second sample rate. According to an embodiment, the first sample rate is greater than the second sample rate. The processor may also be configured to execute an abnormal situation prevention routine to detect the occurrence of an abnormal process event based on the received process variable data. When an abnormal process event is detected, the processor may take steps to preserve a portion of the statistical data related to the received process variable data covering a time period beginning before the abnormal process event is detected and ending after the abnormal process event has been detected. The processor may transmit the preserved portion of the statistical data to a process controller in multiple data packets to overcome any limitations of the communication channel.

In another embodiment, a smart device for controlling at least one aspect of a process is provided. The smart device includes a memory, an input adapted to receive process variable data, and a processor. In this embodiment the processor is configured to store statistical data associated with the process variable data received by the input in the memory. The statistical data are stored in the memory at a first data sample rate. The processor is also configured to communicate the statistical data stored in the memory to an external device. The statistical data are communicated to the external device at a second data sample rate. The first data sample rate is greater than the second data sample rate.

The processor may be further configured to store the statistical data in the memory according to a moving time window of a predetermined length. The statistical data are stored in the memory for a period of time corresponding to the length moving time window. Furthermore, the statistical data are stored in the memory on a first-in first-out basis such that older statistical data stored in the memory at a time corresponding to a trailing edge of the moving time window are discarded as new data are received and stored in the memory at a time corresponding to a leading edge of the moving time window. The processor may be further configured to preserve a portion of the statistical data stored in the memory such that the preserved data cover a predefined period of time before the occurrence of an abnormal event and a predefined period of time after the occurrence of the abnormal event.

In still another embodiment, a method of preserving process control data associated with an abnormal situation is provided. The method calls for receiving process control data associated with a process and temporarily storing statistical data associated with the received process control data in a memory. The statistical data are stored in the memory at a first data sample rate. The method further calls for detecting an abnormal situation associated with the process. A portion of the statistical data stored in the memory is preserved when the abnormal situation is detected. The method calls for communicating the preserved portion of the statistical data over a communication channel at a second data sample rate. The first data sample rate is greater than the second data sample rate. The preserved statistical data communicated over the communication channel may then be displayed on an appropriated interface device. The preserved statistical data communicated over the communication channel may also be analyzed to determine a cause of the abnormal situation.

According to this embodiment, temporarily storing the statistical data may include defining a moving time window of a predetermined length. The statistical data may be continually written to a memory as they become available and temporarily stored in the memory for a length of time at least equal to the length of the moving time window. The statistical data may be stored in the memory on a first-in first-out basis such that the oldest data stored in the memory are discarded as new data are stored. The portion of the statistical data that is preserved after an abnormal situation is detected may include a first portion of the statistical data corresponding to a predetermined length of time before the abnormal situation was detected, and a second portion of the statistical data corresponding to a predetermined length of time after the abnormal situation was detected. Finally, the preserved portion of the statistical data may be communicated over the communication channel as a plurality of data packets, each data packet including an amount of data smaller than the preserved portion of the statistical data.

Further aspects and advantages will be apparent to those of ordinary skill in the art from a review of the following detailed description, taken in conjunction with the drawings. While the compositions and methods are susceptible of embodiments in various forms, the description hereafter includes specific embodiments with the understanding that the disclosure is illustrative, and is not intended to limit the invention to the specific embodiments described herein.

DETAILED DESCRIPTION

Figure 1:
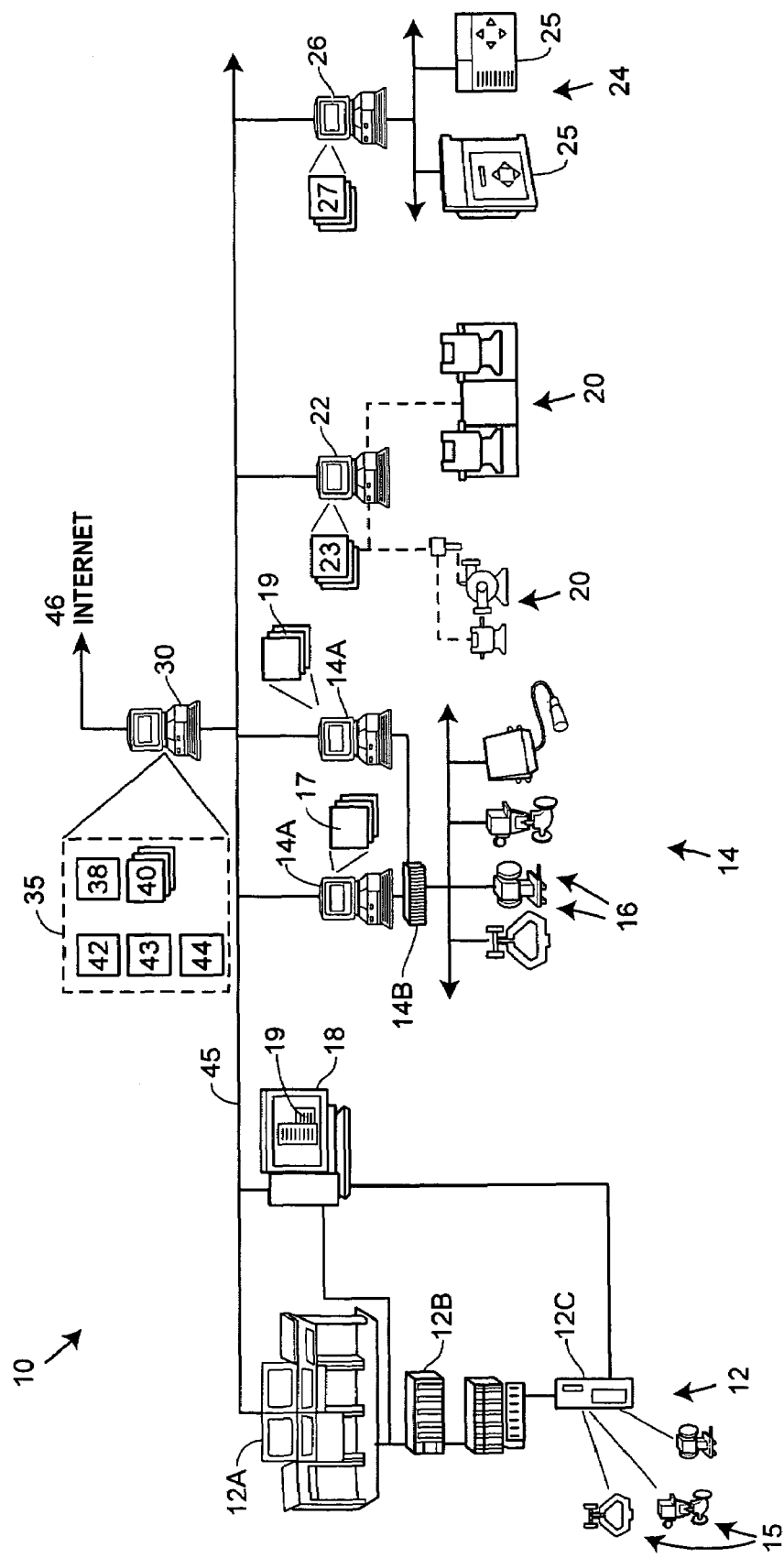
FIG. 1 is an exemplary block diagram of a process plant having a distributed control and maintenance network including one or more operator and maintenance workstations, controllers, field devices and supporting equipment, in which a an abnormal situation prevention system may be implemented.

Referring now to FIG. 1, an exemplary process plant 10 in which an abnormal situation prevention system may be implemented includes a number of control and maintenance systems interconnected together with supporting equipment via one or more communication networks. In particular, the process plant 10 of FIG. 1 includes one or more process control systems 12 and 14. The process control system 12 may be a traditional process control system such as a PROVOX or RS3 system or any other control system which includes an operator interface 12A coupled to a controller 12B and to input/output (I/O) cards 12C which, in turn, are coupled to various field devices such as analog and Highway Addressable Remote Transmitter (HART®) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Emerson Process Management of Austin, Tex. or any other desired type of controllers. The controllers 144B are connected via I/O devices to one or more field devices 16, such as for example, HART® or fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools 17, 19 available to the process control operator for controlling the operation of the process including, for example, control optimizers, diagnostic experts, neural networks, tuners, etc.

Still further, maintenance systems, such as computers executing the monitoring, diagnostics and communication applications described below may be connected to the process control systems 12 and 14 or to the individual devices therein to perform maintenance, monitoring, and diagnostics activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS™ application may be installed in and executed by one or more of the user interfaces 14A associated with the distributed process control system 14 to perform maintenance and monitoring functions, including data collection related to the operating status of the devices 16.

The process plant 10 also includes various rotating (and other) equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute any number of monitoring and diagnostic applications 23, including commercially available applications, such as those provided by Emerson Process Management, as well the applications, modules, and tools described below, to diagnose, monitor and optimize the operating state of the rotating equipment 20 and other equipment in the plant. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25. Again, in many cases, outside consultants or service organizations may use service applications that temporarily acquire or measure data pertaining to the equipment 25 and use this data to perform analyses for the equipment 25 to detect problems, poor performance or other issues effecting the equipment 25. In these cases, the computers (such as the computer 26) running the analyses may not be connected to the rest of the system 10 via any communication line or may be connected only temporarily.

As illustrated in FIG. 1, a computer system 30 implements at least a portion of an abnormal situation prevention system 35, and in particular, the computer system 30 stores and implements a configuration application 38 and, optionally, an abnormal operation detection system 42. Additionally, the computer system 30 may implement an alert/alarm application 43.

Generally speaking, the abnormal situation prevention system 35 may communicate with (or include) abnormal operation detection systems, modules or tools (not shown in FIG. 1) optionally located in the field devices 15, 16, the controllers 12B, 14B, the rotating equipment 20, the support computer 22, the power generation equipment 25 or support computer 26, or any other desired devices and equipment within the process plant 10. It is appreciated that the abnormal situation prevention system may be adapted to utilize process data related to an abnormal event to minimize or prevent a more serious abnormal situation from developing within the operation of the process being monitored and controlled. The abnormal situation prevention system 35 may also interact with the abnormal operation detection system 42 in the computer system 30, to configure each of these abnormal operation detection systems and to receive information regarding the operation of the devices or subsystems that they are monitoring. The abnormal situation prevention system 35 may be communicatively connected via a hardwired bus 45 to each or at least some of the computers or devices within the plant 10, or, alternatively may be connected via any other desired communication connection including, for example, wireless connections, dedicated connections which use OPC (or OLE for process control), intermittent connections, such as ones which rely on handheld devices to collect data, etc. Likewise, the abnormal situation prevention system 35 may obtain data pertaining to the field devices and equipment within the process plant 10 via a LAN or a public connection, such as the Internet, a telephone connection, etc. (illustrated in FIG. 1 as an Internet connection 46) with such data being collected by, for example, a third party service provider. Further, the abnormal situation prevention system 35 may be communicatively coupled to computers/devices in the plant 10 via a variety of techniques and/or protocols including, for example, Ethernet, Modbus, HTML, XML, proprietary techniques/protocols, etc. Thus, although particular examples using OPC to communicatively couple the abnormal situation prevention system 35 to computers/devices in the plant 10 are described herein, one of ordinary skill in the art will recognize that a variety of other methods of coupling the abnormal situation prevention system 35 to computers/devices in the plant 10 can be used as well.

By way of background, OPC is a standard that establishes a mechanism for accessing process data from the plant or process control system. Typically, an OPC server is implemented in a process control system to expose or provide process information from, for example, field devices. An OPC client creates a connection to an OPC server and writes or reads process information to or from a field device. OPC servers use OLE technology (i.e., Component Object Model or COM) to communicate with such clients so that the software applications implemented by the clients can access data from the field devices or other process plant equipment.

Figure 2:
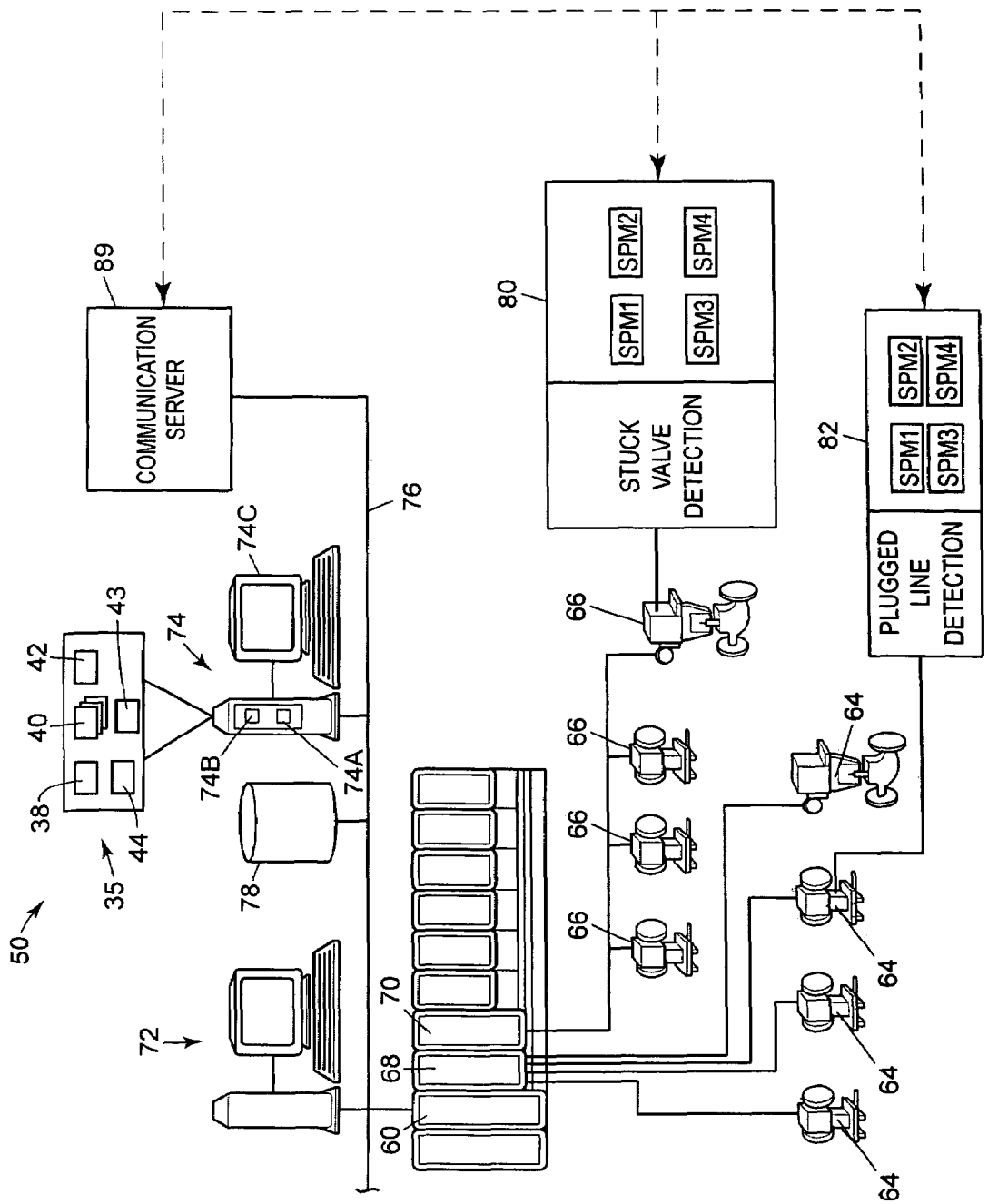
FIG. 2 is an exemplary block diagram of a portion of the process plant of FIG. 1 illustrating communication interconnections between various components of an abnormal situation prevention system located within different elements of the process plant.

FIG. 2 illustrates a portion 50 of the example process plant 10 of FIG. 1 for the purpose of describing one manner in which the abnormal situation prevention system 35 and/or the alert/alarm application 43 may communicate with various devices in the portion 50 of the example process plant 10. While FIG. 2 illustrates communications between the abnormal situation prevention system 35 and one or more abnormal operation detection systems within HART® and fieldbus field devices, it will be understood that similar communications can occur between the abnormal situation prevention system 35 and other devices and equipment within the process plant 10, including any of the devices and equipment illustrated in FIG. 1.

The portion 50 of the process plant 10 illustrated in FIG. 2 includes a distributed process control system having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HARTS field devices and the field devices 66 are illustrated as fieldbus field devices, although these field devices could use any other desired communication protocols. Additionally, each of the field devices 64 and 66 may be any type of device such as, for example, a sensor, a valve, a transmitter, a positioner, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as on-line process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the database 78 may store historical abnormal situation prevention data, including statistical data collected by the field devices 64 and 66 within the process plant 10, statistical data determined from process variables collected by the field devices 64 and 66, and other types of data that will be described below.

While the process controllers 60, I/O devices 68 and 70, and field devices 64 and 66 are typically located down within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant 10. Function blocks typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist, such as model predictive controllers (MPCs), optimizers, etc. It is to be understood that while the fieldbus protocol and the DeltaV™ system use control modules and function blocks designed and implemented in an object-oriented programming language, the control modules may be designed using any desired control programming scheme including, for example, sequential function blocks, ladder logic, etc., and are not limited to being designed using function blocks or any other particular programming technique.

As illustrated in FIG. 2, the maintenance workstation 74 includes a processor 74A, a memory 74B and a display device 74C. The memory 74B stores the abnormal situation prevention application 35 and the alert/alarm application 43 discussed with respect to FIG. 1 in a manner that these applications can be implemented on the processor 74A to provide information to a user via the display 74C (or any other display device, such as a printer).

Each of one or more of the field devices 64 and 66 may include a memory (not shown) for storing routines such as routines for implementing statistical data collection pertaining to one or more process variables sensed by sensing device and/or routines for abnormal operation detection, which will be described below. Each of one or more of the field devices 64 and 66 may also include a processor (not shown) that executes routines such as routines for implementing statistical data collection and/or routines for abnormal operation detection. Statistical data collection and/or abnormal operation detection need not be implemented by software. Rather, one of ordinary skill in the art will recognize that such systems may be implemented by any combination of software, firmware, and/or hardware within one or more field devices and/or other devices.

As shown in FIG. 2, some (and potentially all) of the field devices 64 and 66 include abnormal operation detection (i.e., abnormal situation prevention, or abnormal situation prevention) blocks 80 and 82, which will be described in more detail below. While the blocks 80 and 82 of FIG. 2 are illustrated as being located in one of the devices 64 and in one of the devices 66, these or similar blocks could be located in any number of the field devices 64 and 66, could be located in other devices, such as the controller 60, the I/O devices 68, 70 or any of the devices illustrated in FIG. 1. Additionally, the blocks 80 and 82 could be in any subset of the devices 64 and 66.

Generally speaking, the blocks 80 and 82 or sub-elements of these blocks, collect data, such as process variable data, from the device in which they are located and/or from other devices. Additionally, the blocks 80 and 82 or sub-elements of these blocks may process the variable data and perform an analysis on the data for any number of reasons. For example, the block 80, which is illustrated as being associated with a valve, may have a stuck valve detection routine which analyzes the valve position to determine if the valve is in a stuck condition. In addition, the block 80 may include a set of one or more statistical process monitoring (SPM) blocks or units such as blocks SPM1-SPM4 which may collect process variable or other data within the field device and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. Neither the specific statistical data generated, nor the method in which it is generated, is critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected. It will be understood that, because the SPM blocks are generally located in the devices where the device data is collected, the SPM blocks can acquire quantitatively more and qualitatively more accurate process variable data. As a result, the SPM blocks are generally capable of determining better statistical calculations with respect to the collected process variable data than a block located outside of the device in which the process variable data is collected.

It is to be understood that although the blocks 80 and 82 are shown to include SPM blocks in FIG. 2, the SPM blocks may instead be stand-alone blocks separate from the blocks 80 and 82, and may be located in the same device as the corresponding block 80 or 82 or may be in a different device. The SPM blocks discussed herein may comprise known fieldbus SPM blocks, or SPM blocks that have different or additional capabilities as compared with known fieldbus SPM blocks. The term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the fieldbus protocol, or some other protocol, such as Profibus, HART®, CAN, etc. protocol. If desired, the underlying operation of blocks 80, 82 may be performed or implemented at least partially as described in U.S. Pat. No. 6,017,143, which is hereby incorporated by reference herein.

It is to be understood that although the blocks 80 and 82 are shown to include SPM blocks in FIG. 2, SPM blocks are not required of the blocks 80 and 82. For example, abnormal operation detection routines of the blocks 80 and 82 could operate using process variable data not processed by an SPM block. As another example, the blocks 80 and 82 could each receive and operate on data provided by one or more SPM blocks located in other devices. As yet another example, the process variable data could be processed in a manner that is not provided by many typical SPM blocks. As just one example, the process variable data could be filtered by a finite impulse response (FIR) or infinite impulse response (IIR) filter such as a bandpass filter or some other type of filter. As another example, the process variable data could be trimmed so that it remained in a particular range. Of course, known SPM blocks could be modified to provide such different or additional processing capabilities.

The block 82 of FIG. 2, which is illustrated as being associated with a transmitter, may have a plugged line detection unit that analyzes the process variable data collected by the transmitter to determine if a line within the plant is plugged. In addition, the block 82 may include one or more SPM blocks or units such as blocks SPM1-SPM4 which may collect process variable or other data within the transmitter and perform one or more statistical calculations on the collected data to determine, for example, a mean, a median, a standard deviation, etc. of the collected data. While the blocks 80 and 82 are illustrated as including four SPM blocks each, the blocks 80 and 82 could have any other number of SPM blocks therein for collecting and determining statistical data.

Further details regarding the implementation and configuration of abnormal situation prevention systems and components thereof can be found in U.S. Pat. Publ. No. 2005/0197803, now U.S. Pat. No. 7,079,984 ("abnormal situation prevention in a process plant"), U.S. Pat. Publ. No. 2005/0197806 ("Configuration system and method for abnormal situation prevention in a process plant"), and U.S. Pat. Publ. No. 2005/0197805 ("Data presentation system for abnormal situation prevention in the process plant"), each of which is hereby incorporated by reference for all purposes.

In the abnormal situation prevention systems and techniques described above and in the referenced documents, the SPM (or abnormal situation prevention) blocks 80, 82 may be associated with, or considered components of, one or more abnormal situation prevention modules. While abnormal situation prevention blocks may reside in a controller 60 or other host system or device, such as a computer or workstation 72, 74, the abnormal situation prevention modules may take data from one or more abnormal situation prevention blocks and use the data to make a decision about the larger system. More generally, an abnormal situation prevention module may be developed and configured to receive data from one or more function blocks (e.g., abnormal situation prevention blocks) to support diagnostics for each type of field device, instrumentation or other equipment (e.g., valve, pump, etc.). Nonetheless, the function blocks associated with an abnormal situation prevention module may reside and be implemented by devices other than the specific equipment for which it was developed. In such cases, the abnormal situation prevention module has a distributed nature. Other abnormal situation prevention modules may be implemented entirely within one device, such as the process controller 60, despite being directed toward diagnostics for a specific field device. In any event, a diagnostics routine or technique may be developed for each equipment type for detecting, predicting and preventing abnormal situations or abnormal operation of the equipment (or process). For ease in description only, the term "abnormal situation prevention module" will be used herein to refer to such routines or techniques. An abnormal situation prevention module is therefore responsive to a set of measurements needed to perform the diagnostics, and further includes (i) a set of abnormal conditions to be detected by the module, and (ii) a set of rules, which link a change in the measurements to a corresponding abnormal condition. Furthermore, references to abnormal situation prevention modules in the description of the disclosed techniques to follow are set forth with the understanding that the techniques may be utilized in conjunction with abnormal situation prevention blocks as well.

In some cases, the configuration application 38 or other component of the abnormal situation prevention system 35 may support the development or generation of a template for each abnormal situation prevention module. For example, the configuration and development platform provided by the DeltaV™ control system may be used to create specific instances, or instantiations, of abnormal situation prevention modules from corresponding composite template blocks.

Although shown and described in connection with FIG. 2 as abnormal situation prevention functionality, the modules and blocks described above may be more generally directed to implementing multivariate statistical techniques configured for process monitoring and diagnostics and fault detection as described below. In some cases, the techniques described below may include or be integrated with abnormal situation prevention modules or blocks. In any case, references below to systems and techniques (and any modules, function blocks, applications, software or other components or aspects thereof) may utilize, include, be integrated with, or otherwise be associated with the workstation tools 17, 19, operator interfaces 12A, 14A, applications 23, abnormal situation prevention system 25 and interfaces 72, 74 described above.

As described above, and as shown in FIG. 2, an embodiment of an abnormal situation prevention system may include an abnormal situation prevention computer 74 including a processor, 74A a memory 74B, and a display device 74C. Software implemented on the abnormal situation prevention computer may be logically divided into a number of individual components or applications. These include the abnormal situation prevention configuration application 38; the interface application 40; the abnormal operation detection application 42; and the alert/alarm application 43. The abnormal situation prevention computer 74 communicates with abnormal situation prevention modules located in other equipment. abnormal situation prevention modules are specialized function modules or subroutines of the overall control scheme that may be executed by processors found in the various devices in which the abnormal situation prevention modules reside. The abnormal situation prevention modules may be located, for example, within process controllers, I/O cards or other I/O devices, field devices such as sensors, valves, positioners, transmitters, rotating equipment, power generation equipment, and the like.

The abnormal situation prevention blocks located in various field devices 15,16, rotating equipment 20, power generation equipment 25 or other equipment, may be configured to collect data, perform statistical process monitoring (SPM) on collected data, and perform statistical analysis on collected data and various statistical measures calculated by SPM blocks to evaluate various operating conditions of the process and to detect the occurrence of abnormal situations. For example, an abnormal situation prevention block may be configured to detect whether a valve is stuck in an improper position, or whether a process line is plugged, as indicated by the abnormal situation prevention blocks 80, 82 shown in FIG. 2. The abnormal situation prevention blocks may analyze data acquired from the device in which they are located, or they may analyze data from one or more remote devices, or they may analyze data from both the device in which they are located as well as data received from one or more remote devices. Furthermore, the abnormal situation prevention blocks may analyze raw data received directly from process control devices such as field devices, rotating equipment, power generating equipment, or the like, or the abnormal situation prevention blocks may rely on processed data and derived statistical measures provided by SPM blocks associated with the abnormal situation prevention blocks. The SPM blocks may perform any number of different functions to collect, process and otherwise manipulate data received from the various process control devices, in order to present the data in a more meaningful context.

abnormal situation prevention modules and SPM blocks located within the process control equipment from which they receive data are capable of sampling the data at a much faster rate than is possible when the abnormal situation prevention and SPM modules are remote from the devices that actually sense the data, due to limitations of the communication channel and the communication protocol. Therefore, an advantage of locating an abnormal situation prevention block and any associated SPM blocks directly within the device from which the data are generated is that the amount and quality of the data that may be analyzed is significantly improved. Therefore, the accuracy of the calculations, the quality of the analysis, and the confidence one may have in the conclusions drawn therefrom are improved as well.

An abnormal situation prevention block detects an abnormal situation when one or more measured process variables or statistical measures run contrary to the rule defining the corresponding abnormal condition. When an abnormal situation prevention block detects an abnormal situation or the occurrence of an abnormal event, the abnormal situation prevention block alerts the controller 60 or other control device that an abnormal situation exists, or that an abnormal event has occurred. The abnormal situation prevention block sends the alert via the communication bus 76. The host controller 60 or other control device in turn forwards information regarding the abnormal situation to the abnormal situation prevention computer 30 so that the interface application 40 may cause an alarm or other indicator to be displayed on the display device 30C to alert an operator or other maintenance personnel of the abnormal situation. The operator or other maintenance personnel may then take appropriate steps to resolve the problem that caused the detected abnormal situation.

In addition to detecting the presence of abnormal operating conditions, the data and statistical measures acquired by an abnormal situation prevention module and calculated by the abnormal situation prevention module's associated SPM blocks are used for locally monitoring the particular process control equipment in which they are located and implementing process control functions that are performed by the equipment. Typically, data and statistical calculations underlying the operation of an abnormal situation prevention module and its associated SPM blocks need not be communicated to the higher levels of the distributed process control system. This is especially true when the data are collected at the device at a rate far in excess of the rate at which data may be communicated to the controller or other higher level control device over the communication channel. Nonetheless, the data acquired before and after an abnormal situation arises may provide important clues as to how the abnormal situation arose and how similar abnormal situations may be prevented in the future. For example, data recorded before and immediately following the occurrence of an abnormal situation may include characteristic patterns that would allow a skilled operator or maintenance technician to identify the root cause of the abnormal condition and take steps to prevent it from occurring in the future. Other characteristic patterns in the received data may be sufficient to predict upcoming abnormal situations well in advance so that steps may be taken to prevent the predicted abnormal condition from actually occurring. For example, a sensor that is about to fail may begin exhibiting erratic readings that are nonetheless within an acceptable range as far as the process is concerned. Recognizing the erratic behavior and replacing the sensor before it completely fails may avoid a costly process control failure in the future.

In order to preserve process control data acquired before and after the occurrence of an abnormal event, a smart field device or other intelligent device or equipment implementing an abnormal situation prevention module may include a memory for temporarily storing process control data both in the form of raw variable data, and/or statistical data calculated by SPM blocks associated with the abnormal situation prevention module. The memory may be organized as a first-in-first out memory so that older data are discarded as newer data are recorded. The memory may be sized so that it can store all of the data, including all of the raw process variable values and calculated statistical measures, acquired by the abnormal situation prevention module over a designated period of time. The length of time for which data are collected and stored can be determined based on the amount of data necessary to analyze the particular abnormal event being detected. For example, for a particular abnormal event it may be beneficial to analyze all of the data acquired by an abnormal situation prevention block in the minute immediately preceding the occurrence of abnormal event and the first minute immediately following the occurrence of the abnormal event. In this case, the memory must be large enough to store two minutes worth of acquired data. In another case, it may only be necessary to view only 15 seconds worth of data before the abnormal event and 45 seconds of data following the event. In this case, the memory must be capable of storing just one minute of acquired data. One may envision scenarios in which widely varying amounts of data may need to be stored in the memory associated with a smart device for future off-line analysis to discover the causes of various abnormal situations and to prevent their occurrence in the future.

As mentioned above, the buffer memory may be organized as a first-in first-out memory such that the oldest data stored in the memory are discarded as new process variable data are acquired and stored. In effect, the data stored in the memory provide a "rolling window" or "snapshot" of the process variable data acquired by the abnormal situation prevention module over a period of time. The rolling window or snapshot moves forward in time, always including the most recently acquired data and discarding older data. When the abnormal situation prevention module detects an abnormal situation it freezes the data stored in the memory, preserving a snapshot of the data acquired by the abnormal situation prevention module at a particular moment in time, namely the period immediately preceding the abnormal event and, if desired, the period immediately following.

Figure 3:
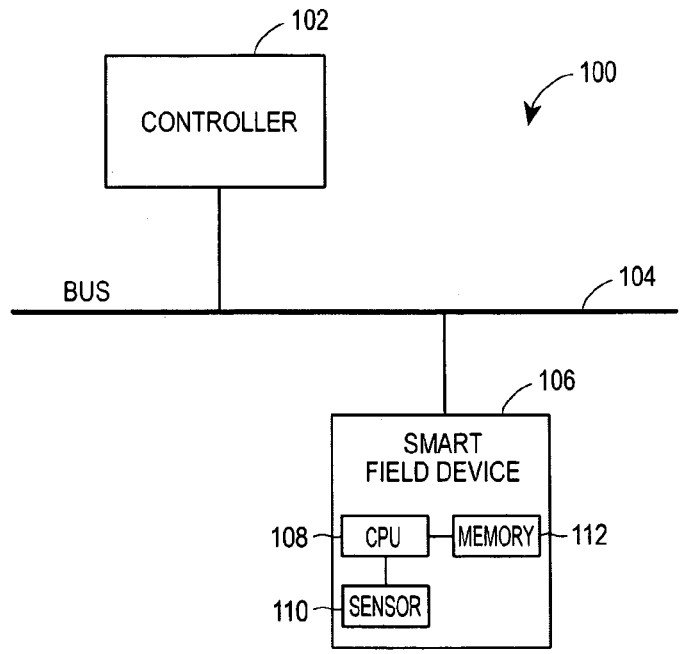
FIG. 3 is an exemplary block diagram of a portion of the process plant of FIG. 1 illustrating the communication interconnections between a field device or other intelligent equipment and a process controller.

Operation of a smart field device or other intelligent device equipped with an abnormal situation prevention module adapted to retain data and statistical measurements acquired before, during and after the occurrence of an abnormal event is best explained by way of example. FIG. 3 shows a portion of a distributed process control system 100. The portion of a distributed process control system 100 shown in FIG. 3 includes a controller 102 and a smart process control device 106. The smart process control device 106 may be a smart field device such as a valve, sensor, transmitter, positioner, or other intelligent device such as a pump, a mixer or other rotating equipment, power generating equipment, or the like. The smart process control device 106 includes a processor 108, a sensor or other input device 110, and a memory 112. The processor is configured to execute an abnormal situation prevention module and associated SPM blocks. The sensor or other input device 110 gathers process control data regarding the status of the process or the status of the device itself. The memory 112 stores the data received from the input device 110, as well as the results of any statistical calculations performed by SPM blocks associated with the abnormal situation prevention module resident in the smart device 106. The memory 112 may be organized as a first-in first-out memory as described above.

Figure 4:
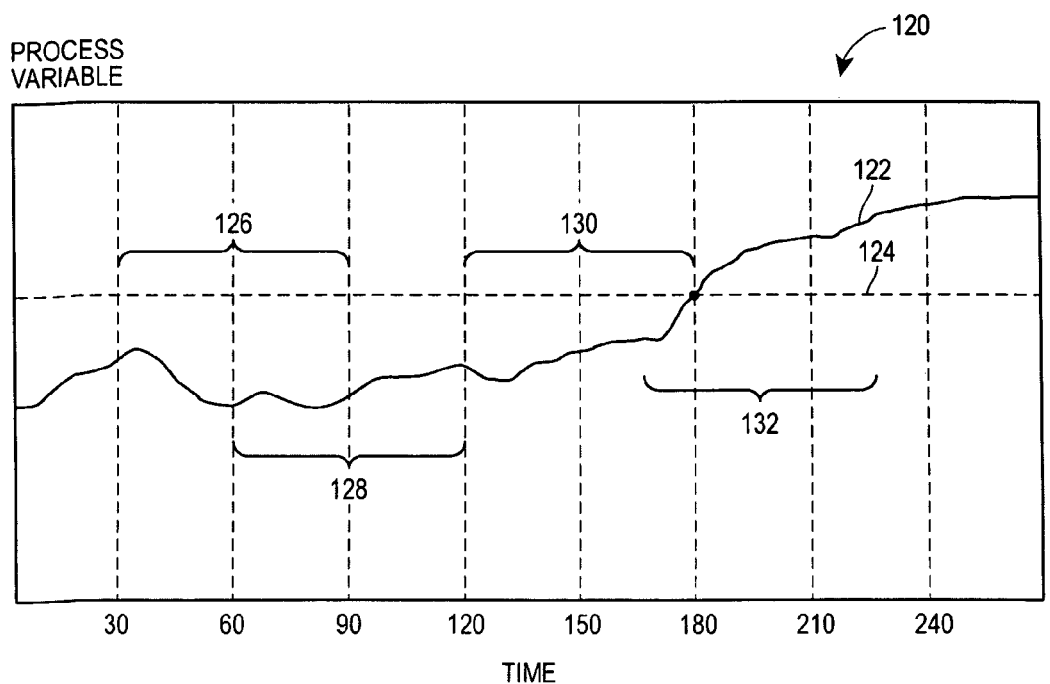
FIG. 4 is a plot showing exemplary process variable data recorded by a field device or other intelligent equipment.

FIG. 4 is a plot that shows sample data 122 acquired and/or processed over a period of time by an abnormal situation prevention module or SPM module resident in smart process control device 106. The data 122 shown in FIG. 4 could be the raw values for temperature, pressure, position or some other variable measured by the sensor 110. Alternatively, the data 122 could be the calculated mean, median, standard deviation or some other statistical measure of a process variable measured by the sensor 110 and calculated according to various SPM blocks associated with the abnormal situation prevention module resident in the process control device 106.

FIG. 4 includes a threshold value 124 displayed along with the process variable data 122. The threshold value 124 indicates a process fault or abnormal condition. If the value of the variable represented by data 122 rises above the threshold value 124 it is considered an abnormal situation. Under such circumstances an alarm or warning is communicated from the process control device 106 back to the controller 102 via the communication bus 104. The controller may in turn communicate the alarm to an abnormal situation prevention computer as described above, and the abnormal situation prevention computer may cause the alarm to be displayed for an operator or other maintenance personnel. Also, if the value of the variable represented by data 122 exceeds the threshold value 124, the abnormal situation prevention module captures a "snapshot" of the data 122 for a period of time surrounding the occurrence of the abnormal event. For purposes of the present example, assume that the abnormal situation prevention module is configured to capture a one minute wide window of data comprising the 15 seconds immediately preceding the occurrence of an abnormal event and the 45 seconds immediately following the abnormal event.

Figure 5:
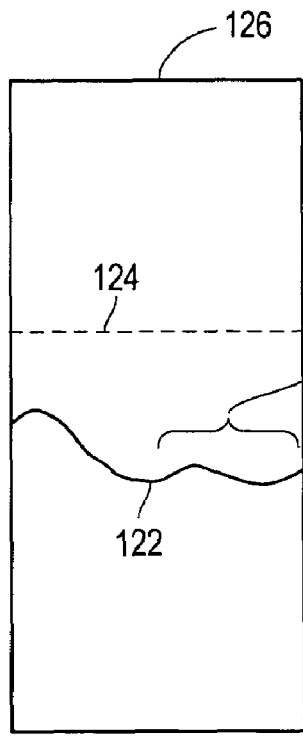
FIG. 5 is a plot showing a portion of the exemplary process variable data of FIG. 4 recorded in a rolling time window corresponding to a first period of time.
Figure 6:
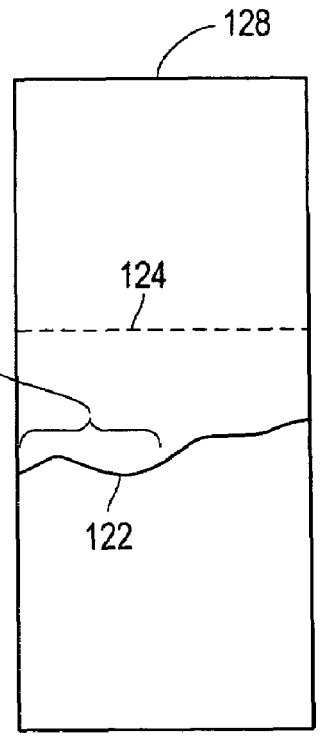
FIG. 6 is a plot showing a portion of the exemplary process variable data of FIG. 4 recorded in a "rolling time window" corresponding to a second period of time.
Figure 7:
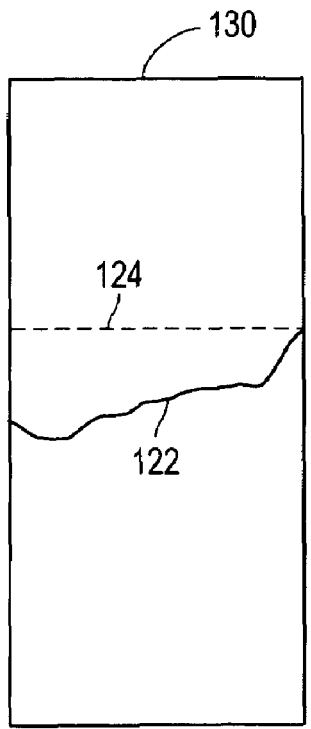
FIG. 7 is a plot showing a portion of the exemplary process variable data of FIG. 4 recorded in a rolling time window corresponding to a third period of time.

The memory 112 is configured as a first-in first-out memory. Data that are older than one minute are discarded as new data are acquired and stored in the memory 112. Thus, the data stored in the memory 112 represents a continuously moving window or snapshot of the data acquired by the abnormal situation prevention module. The moving snapshot effect can be seen in FIGS. 5-8. FIG. 5 represents the data stored in the memory 112 and captured during the time period 126 between 30 and 90 seconds of operation. FIG. 6 shows the data stored in the memory 112, thirty seconds later captured during the time period 128 between 60 and 120 seconds of operation. As can be seen, data corresponding to the period of overlap between the snapshot window 126 of FIG. 5 and the snapshot window 128 shown in FIG. 6, namely the period between sixty and ninety seconds of operation, is repeated in both figures. In FIG. 5, the overlapping data 134 are the newer data located on the right side of the window 126, and in FIG. 6 the overlapping data 146 are the older data located on the left side of the window 128. As will be described below, FIG. 7 represents data collected over a period of time up to and including the detection of an abnormal event, and FIG. 8 represents data collected over a period of time both before and after the occurrence of an abnormal event.

Returning to FIG. 4, recall that according to the example, an abnormal situation exists if the value of the process control variable 122 exceeds the threshold value 124. As can be seen, the value of the process control variable 122 crosses the threshold value 124 at one hundred eighty seconds of operation. At this time, the memory 112 stores the process variable data captured during the time period 130, namely the previous minute of operation between one hundred twenty and one hundred eighty seconds of operation. The data stored in the memory 112 during this period is shown in FIG. 7. Note that the in the time window 130 shown in FIG. 7, the last value of the process variable recorded is the value that first crossed the threshold value 124. However, according to the example, the abnormal situation prevention module resident in the smart process control device 106 is configured to detect the abnormal situation and preserve process variable data captured in the fifteen seconds immediately preceding the occurrence of the abnormal situation and the forty-five seconds immediately following. Thus, the memory must continue storing new data and discarding old data for an additional forty-five seconds after the abnormal situation is detected.

Figure 8:
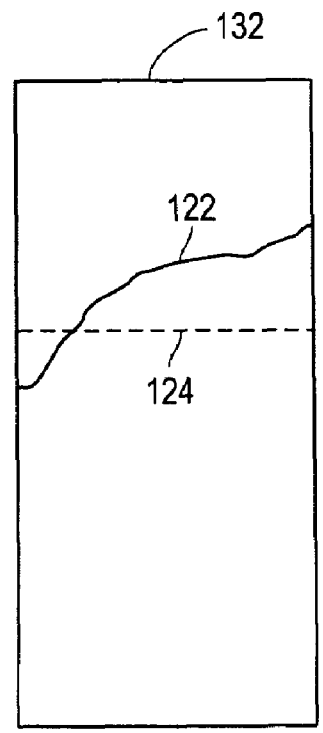
FIG. 8 is a plot showing a portion of the exemplary process variable data of FIG. 4 recorded in a rolling time window corresponding to a fourth period of time.

Forty-five seconds after the occurrence of the abnormal event, the memory 112 holds all the historical process variable data from the desired time period 132, namely the fifteen seconds recorded before the occurrence of the abnormal situation and the forty-five seconds following the occurrence of the abnormal situation, as shown in FIG. 8.

The data captured in the buffer memory 112 is captured at a rate that is faster than the rate at which the captured data can be communicated to the controller 102 or to other higher level control devices over the communication bus 104. Therefore, the data may not be communicated to the controller as they are captured in real time. However, once the data surrounding the occurrence of an abnormal event have been preserved in the memory 112, they may be communicated to the controller 102 or to another control device at a later time and at a slower rate that is compatible with the limitations of the communication bus 104. Furthermore, the data may be broken up into smaller quantities or data packets and sent to the controller 102 or other control device piecemeal to further reduce the demands on the communication bus 102.

The preserved process variable data may eventually be displayed by the abnormal situation prevention interface application 40 (FIG. 2) for operator or maintenance personnel. The operator or maintenance personnel may then analyze the data to determine the appropriate steps to be taken to prevent the abnormal situation from occurring in the future, or the appropriate steps to be taken to minimize or prevent a more significant abnormal situation from developing.

The present invention has been described with reference to specific examples. These examples are intended to be illustrative only and should not be read as limiting the invention in any way. It will be apparent to those of ordinary skill in the art that changes, additions or deletions may be made to the disclosed embodiments without departing from the spirit and scope of the invention.

What is claimed is:

1. A system for processing data related to an abnormal process event in a controlled process, the system comprising:
a controller
a communication channel; and
an intelligent process control field device having a processor, a memory, and an input device, the input device adapted to measure process variable data, the processor configured to temporarily store statistical data related to the measured process variable data in the memory at a first sample rate, upon detection of an abnormal process event the processor further configured to preserve a portion of the statistical data temporarily stored in the memory, the preserved portion of the statistical data corresponding to a time period beginning before the abnormal process event, and to communicate the preserved portion of the statistical data to the controller over the communication channel at a second sample rate.

2. The system of claim 1 wherein preserved portion of the statistical data stored in the memory and communicated to the controller corresponds to a time period ending after the occurrence of the abnormal process event.

3. The system of claim 2 wherein the processor is further configured to transmit the preserved portion of the statistical data at a time after the occurrence of the abnormal event.

4. The system of claim 3 wherein the processor is adapted to transmit the preserved portion of the statistical data in a plurality of data packets.

5. The system of claim 1 further comprising a display device and an interface application, the interface application adapted to cause at least a portion of the statistical data related to the process variable data communicated to the controller to be displayed on the display device.

6. The system of claim 1 wherein statistical data related to the process variable data comprise the process variable data received by the input device.

7. The system of claim 1 wherein statistical data related to the process variable data comprise statistical values calculated from the process variable data received by the input device.

8. The system of claim 1 wherein the first sample rate is greater than the second sample rate at which the statistical data stored in the memory are communicated to the controller.

9. The system of claim 1 wherein the processor is further configured to temporarily store the statistical data in the memory corresponding to a moving time window of a defined length, such that the statistical data stored in the memory corresponds to process variable data received over a period of time corresponding to the length of the moving time window.

10. The system of claim 9 wherein the defined length of the moving time window is selected dynamically based on an abnormal condition to which the process variable data relate.

11. A smart device for controlling at least one aspect of a process, the smart device comprising:
a memory;
an input adapted to receive process variable data; and
a processor configured to temporarily store statistical data associated with the received process variable data in the memory at a first data sample rate, and upon the detection of an abnormal process event to preserve a portion of the statistical data stored in the memory and to thereafter communicate the preserved statistical data to an external device at a second data sample rate.

12. The smart device of claim 11 wherein the first data sample rate is greater than the second data sample rate.

13. The smart device of claim 11 wherein the processor is further configured to store the statistical data in the memory according to a moving time window of a predetermined length, such that the memory stores statistical data for a period of time corresponding to the length moving time window.

14. The smart device of claim 13 wherein the statistical data are stored in the memory on a first-in first-out basis such that older statistical data received and stored in the memory at a time corresponding to a trailing edge of the moving time window are discarded as new data received at a time corresponding to a leading edge of the moving time window are stored in the memory.

15. The smart device of claim 11 wherein the processor is further configured to detect the occurrence of an abnormal event.

16. The smart device of claim 15 wherein the processor is further configured to preserve a portion of the statistical data stored in the memory corresponding to a predefined period of time before the occurrence of the abnormal event, and a predefined period of time following the occurrence of the abnormal event.

17. The smart device of claim 16 wherein the predefined period of time is determined dynamically based on a current operating state of the process.

18. The smart device of claim 16 wherein the processor is further configured to communicate the portion of the statistical data stored in the memory at a time following the occurrence of the abnormal event.

19. The smart device of claim 16 wherein the processor is further configured to communicate the portion of the statistical data stored in the memory via a plurality of data packets.

20. A method of preserving process control data associated with an abnormal situation, the method comprising:
   receiving process variable data associated with a process;
   temporarily storing statistical data associated with the received process variable data in a memory at a first data sample rate;
   detecting an abnormal situation associated with the process;
   preserving a portion of the statistical data stored in the memory in response to the abnormal situation; and
   communicating the preserved portion of the statistical data associated with the received process control data over a communication channel at a second data sample rate.

21. The method of claim 20 further comprising displaying the preserved portion of the statistical data communicated over the communication channel on an interface device.

22. The method of claim 20 further comprising analyzing the preserved portion of the statistical data communicated over the communication channel to determine a cause of the abnormal situation.

23. The method of claim 20 wherein temporarily storing statistical data associated with received process variable data comprises defining a moving time window of a predetermined length, wherein statistical data are continually written to a memory as they become available, and wherein the statistical data are stored in the memory for a length of time at least equal to the length of the moving time window.

24. The method of claim 20 wherein the first data sample rate is greater than the second data sample rate.

25. The method of claim 20 wherein communicating the preserved portion of the statistical data over a communication channel comprises communicating a plurality of data packets each including an amount of data smaller than the preserved portion of the statistical data.

26. The method of claim 20 wherein preserving a portion of the statistical data comprises preserving a first portion of the statistical data corresponding to a predetermined length of time before the abnormal situation was detected, and preserving a second portion of the statistical data corresponding to a predetermined length of time after the abnormal situation was detected.

* * * * *